Sept. 22, 1936.  W. P. CHANDLER, JR  2,055,336
METHOD AND APPARATUS FOR EFFECTING CONTACT BETWEEN LIQUIDS AND GASES
Filed Aug. 20, 1934
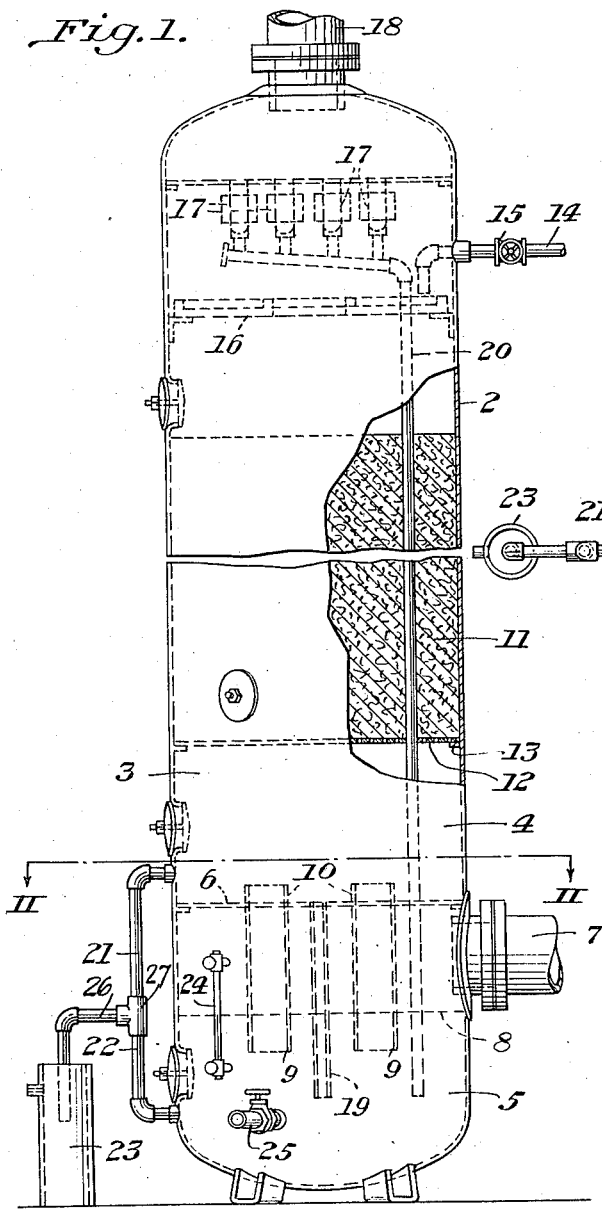
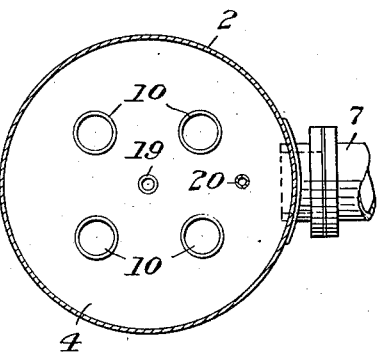
INVENTOR
Willard P. Chandler Jr
by
Byrnes, Stebbins & Blenko
his attorneys Patented Sept. 22, 1936

2,055,336

UNITED STATES PATENT OFFICE 2,055,336

METHOD AND APPARATUS FOR EFFECTING CONTACT BETWEEN LIQUIDS AND GASES

Willard P. Chandler, Jr., Pittsburgh, Pa., assignor to Blaw-Knox Company, Pittsburgh, Pa., a corporation of New Jersey Application August 20, 1934, Serial No. 740,556

12 Claims. (Cl. 261—97)

The present invention relates to a method and apparatus for effecting intimate contact between a liquid and a gas.

By my invention I provide an improved method and apparatus for effecting intimate contact between a liquid and a gas for the purpose of causing an interchange or absorption between the liquid and the gas. Either the liquid may absorb certain constituents from the gas or the gas may absorb certain constituents from the liquid or other chemical changes may take place in which absorption of different constituents takes place in both directions. The precise nature of the chemical or physical action which takes place in carrying out my invention is not the subject of the present invention as this is merely dependent upon the chemical process which is being carried out in the practice of my invention.

In the accompanying drawing I have shown for purposes of illustration only a preferred embodiment of my invention and in the present specification I shall describe a preferred method of effecting intimate contact between the liquid and the gas. It will be understood, however, that my invention is not limited to the particular method and apparatus disclosed herein as my invention may be otherwise embodied and practiced.

In the accompanying drawing,

Figure 1 is an elevational view, partly broken away, of an apparatus embodying my invention; and Figure 2 is a section, taken along the line II—II of Figure 1.

As shown in the drawing, the apparatus which I provide comprises a shell 2 forming an enclosed chamber 3 which is divided into an upper compartment 4 and a lower compartment 5 by a plate or diaphragm 6 extending transversely across the chamber. The gas is introduced into the lower compartment 5 through the gas inlet 7. The inlet 7 is so located that the gas flows into the lower compartment 5 above the highest liquid level indicated by the reference character 8. In order to escape from the lower compartment 5 the gas must depress the liquid level sufficiently, and pass beneath a release edge constituting the lower edge 9 of one of the cylindrical tubes 10 which extend through the diaphragm 6 and downwardly to a point adjacent the liquid level in the lower compartment. In the embodiment shown in the drawing, I have shown four such tubes. It will be understood, however, that any appropriate number of tubes of this character may be used for discharging the gas from the lower compartment 5 into the upper compartment 4.

The gas converging radially of the tubes 10 displaces the liquid toward the center of each tube. This displacement of the liquid inwardly results in a heaping up of the same, the heap tending to form into a cone but changing shape constantly due to agitation of the surface of the heap by the inwardly and upwardly flowing gas.

As the gas passes under the release edges 9, it will become intimately mixed with the liquid and carries a portion thereof with it in its further travel. After the gas has become intimately mixed with the liquid, it passes on upwardly through the tubes and is discharged thereby into the upper compartment 4 of the chamber 3 together with the liquid which has been carried upwardly through the tubes with the gas.

The particular method of effecting intimate contact between the liquid and the gas above described is more particularly described and claimed in the copending application of Donald A. Sillers, Serial No. 587,684, filed January 29, 1932, issued as U. S. Patent No. 2,048,145 on July 26, 1936. This particular portion of the apparatus and method per se forms no part of my invention.

After passing through these tubes, the gas passes upwardly through a body of interstitial or foraminous material 11 located between the diaphragm 6 and the outlet opening of the structure. This body of material is mounted on a perforated plate 12 which may be suitably mounted on ledges 13 on the inner face of the casing. This material may be packing material or any other type of interstitial or foraminous material which will permit the gas to pass therethrough and come into intimate contact with liquid which is also passed through the material in the opposite direction.

Liquid may be introduced into the apparatus by an inlet pipe 14, the flow through which is controlled by a valve 15. The inlet pipe 14 feeds the liquid to a pan or plate 16. This plate may be either porous or perforated. However, it must be of such character or material as to permit the liquid to be fed to the top of the material 11 therethrough. The liquid seeps through the porous plate or trickles through perforations in the plate and drips onto the material below, thereby dividing the liquid and distributing it over the surface of the packing material.

It will be understood, of course, that instead of a porous or perforated plate as shown in the drawing, a system of sprays can be used for dividing the liquid into small particles and distributing it over the surface of the packing material.

The liquid fed through the porous plate and onto the material 11 percolates downwardly through the interstices of the material and passes through the perforated plate 12 and is dropped onto the diaphragm 6.

As can be seen from the above, the liquid passes through the body of material in one direction and the gas passes through the material at the same time in the other direction. While passing through this material, the gas contacts with the liquid and there is an interchange or absorption between the liquid and the gas. As stated above, either the liquid will absorb certain constituents from the gas, or the gas will absorb certain constituents from the liquid, or other chemical change in which absorption of different constituents takes place in both directions will be accomplished in this portion of the structure. After the gas has passed through the body of material 11 it continues upwardly and is passed through moisture eliminators 17 for the purpose of removing surplus liquid therefrom. Any other suitable type of apparatus may be used for the purpose of eliminating entrained particles of liquid from the gas. The gas then passes out of the apparatus through outlet opening 18.

After the liquid has passed downwardly through the packing material and through the perforated plate 12, and onto the diaphragm 6, it continues on down through the pipe 19 and is discharged into the main body of liquid in the bottom of the tank. This pipe 19 also serves to return to the main body of liquid for further circulation liquid which has been carried upwardly through the tubes 10 and which has been collected upon the diaphragm 6. A pipe 20 is also provided for returning to the body of the liquid in the bottom of the tank any liquid which is removed by the moisture eliminators 17.

The liquid level in the lower compartment 5 is prevented from rising higher than the level 8 by the overflow pipe 26, which by means of the T 27 and the pipe 22 is connected to the lower part of the compartment 5. The outlet from the pipe 26 is trapped by extending downwardly into a seal 23, the liquid overflowing on occasion at the top of the seal 23. Extending upwardly from the T 27 is a pipe 21 which enters the compartment 4 at any convenient point above the diaphragm 6. The depth of the trap in 23 is somewhat greater than the vertical distance between the level 8 and the lower edges 9 of the conduits 10. Consequently, when gas is flowing the pressure of gas entering the inlet 7 must be sufficient to depress the liquid level not only below the level 8 but also below the release edge 9, while the trap at 23 is sufficient to prevent escape of gas at that point.

It will be seen from the above discussion of the apparatus which I provide that fresh liquid is supplied at the top of the apparatus and fresh gas at the bottom so that as the liquid moves downwardly through the material 11 it encounters gas of increasing degrees of freshness while as the gas moves upwardly it encounters liquid of increasing degrees of freshness. It will be seen, therefore, that the action of each material upon the other is cumulative and the maximum amount of effect is secured.

It will be understood that if the apparatus above described were used without the contactor, by the time the liquid passing downwardly through the interstitial material would reach the bottom thereof it would become fairly well saturated with the material given up by the gas or would have given up the larger portion of the constituents which it imparts to the gas. Consequently, further lengthening of the column of packing material would not proportionately increase the efficiency of the apparatus for carrying on the process. The use of the contactor in the manner which I provide in combination with the interstitial material makes it possible to contact liquid which has already passed through the interstitial material more rapidly and more effectively and with a larger quantity of liquid in the space provided than could possibly be effected by merely increasing the depth of the interstitial material. The apparatus which I provide is a considerably more efficient unit than could possibly be obtained by merely increasing the amount of material used in the apparatus. Furthermore, the use of the material above the contactor renders the apparatus for effecting contact between the liquid and the gas more efficient than could possibly be obtained by merely increasing the size of the contactor. This is due to the fact that the chemical action between the two materials takes place progressively, the fresh gas passing in at one end and the fresh liquid in at the other end, while the outlet for the treated gas is in proximity to the inlet for the fresh liquid and the outlet for the treated liquid is in proximity to the inlet for the fresh gas.

An additional feature of my invention not pointed out heretofore resides in the fact that while the liquid from above percolates downward only until it reaches the bottom of the tank, this same liquid is circulated upwardly through the contactor tubes and used many times in the treating process in the bottom of the tank so that the method of treatment in the bottom of the tank is such as to contact the same liquid with gas at a much greater extent than it is contacted in the material above the contactor in the base of the tank because it is circulated through tubes as many times as may be necessary, depending upon the amount of liquid available and the character of the process being carried out in the apparatus.

I have found the apparatus and method which I provide to be particularly effective in the contacting of liquid and gas. As pointed out above, it may be utilized for a large number of purposes.

While I have shown and described a preferred embodiment of my invention and the preferred method of practicing the same, it will be understood that my invention may be otherwise embodied and practiced within the scope of the appended claims.

I claim:

1. The method of effecting intimate contact between a liquid and a gas which comprises passing the gas over the surface of a body of liquid and causing it to converge and pass sufficiently rapidly both beneath a release edge adjacent the surface of the liquid and upwardly through a confined passageway to raise a heap of liquid within an area defined by said release edge and atomize a portion thereof, collecting at least a portion of the atomized liquid and returning it to the body of liquid for further circulation through said confined passageway, thereafter passing the gas in one direction through a body of interstitial material, and at the same time passing a liquid in the opposite direction through said material.

2. The method of effecting intimate contact between a liquid and a gas which comprises passing the gas over the surface of a body of liquid and causing it to converge and pass sufficiently rapidly both beneath a release edge adjacent the surface of the liquid and upwardly through a confined passageway to raise a heap of liquid within an area defined by said release edge and atomize a portion thereof, collecting at least a portion of the atomized liquid and returning it to the body of liquid for further circulation through said confined passageway, thereafter passing the gas in one direction through a body of interstitial material, at the same time passing a liquid in a divided state in the opposite direction through said body of material, and thereafter removing entrained particles of liquid from said gas.

3. The method of effecting intimate contact between a liquid and a gas which comprises passing the gas over the surface of a body of liquid, causing it to converge and pass sufficiently rapidly both beneath a release edge adjacent the surface of the liquid and upwardly through a confined passageway to raise a cone of liquid within an area defined by said release edge and atomize a portion thereof and carry it completely through said passageway, thereafter passing the gas in one direction through a body of interstitial material, at the same time passing a liquid in the opposite direction through said body of material, and collecting at least a portion of the atomized liquid and returning it to the main body of liquid for further circulation.

4. The method of effecting intimate contact between a liquid and a gas which comprises passing the gas over the surface of a body of liquid, causing it to converge and pass sufficiently rapidly both beneath a release edge adjacent the surface of the liquid and upwardly through a confined passageway to raise a cone of liquid within an area defined by said release edge and atomize a portion thereof and carry it completely through said passageway, thereafter passing the gas in one direction through a body of interstitial material, at the same time passing liquid in the opposite direction through said body of material, and collecting at least a portion of the atomized liquid and the liquid passing through said material and passing it into said body of liquid.

5. Contact apparatus for liquid and gas comprising an enclosed chamber, a transverse plate separating said chamber into an upper and lower compartment, a conduit connecting the upper and lower compartments and extending downwardly into said lower compartment to a point adjacent the surface of the liquid in the container, means for passing gas into said lower compartment above the liquid level and upwardly through said conduit, the cross-sectional area of said conduit being sufficiently small relative to the cross-sectional area of the chamber and the gas pressure to cause the gas to flow past the lower edge of the conduit and upwardly therethrough at velocities sufficient to raise a heap of liquid within an area defined by said conduit and atomize a portion thereof and carry it upwardly into said upper compartment, a second transverse plate spaced above said first-mentioned transverse plate dividing the upper compartment into upper and lower sections, said second plate being provided with openings to permit the passage of gas or liquid therethrough, a body of interstitial material within said upper section through which the gas passes in an upward direction after passing through the lower compartment, means for passing a liquid in the opposite direction through said material, an outlet for withdrawing gas from said chamber, and means for returning at least a portion of the liquid circulated upwardly through said conduit to said body of liquid for recirculation.

6. The method of effecting intimate contact between a liquid and a gas within an enclosed chamber which comprises passing the gas over the surface of a body of liquid within the chamber and bringing it into intimate contact therewith by causing it to atomize and circulate a portion thereof upwardly within the chamber, collecting a portion of the circulated liquid and returning it to the body of liquid for further circulation upwardly within the chamber, thereafter passing the gas in one direction through a body of interstitial material, and at the same time passing a liquid in a divided state in the opposite direction through said body of material.

7. Contact apparatus for liquid and gas comprising an enclosed chamber, a gas inlet for supplying gas to said chamber, a gas outlet for withdrawing gas from said chamber, means for passing the gas over the surface of a body of the liquid in the container for effecting intimate contact therebetween by causing it to atomize a portion of the liquid and circulate it upwardly within said chamber, means for collecting a portion of said liquid and returning it to the body of liquid for further circulation within the chamber, a body of interstitial material within said container between said inlet and outlet through which the gas passes in one direction, and means for passing a liquid through said material in the opposite direction for effecting further intimate contact between the liquid and the gas.

8. Contact apparatus for liquid and gas comprising an enclosed chamber, a gas inlet for supplying gas to said chamber, a gas outlet for withdrawing gas from said chamber, means for passing the gas over the surface of a body of the liquid in the container for effecting intimate contact therebetween by causing it to atomize a portion of the liquid and circulate it upwardly within said chamber, means for collecting a portion of said liquid and returning it to the body of liquid for further circulation within the chamber, a body of interstitial material within said container between said inlet and outlet through which the gas passes in one direction, means for passing a liquid through said material in the opposite direction for effecting further intimate contact between the liquid and the gas and means for thereafter removing entrained particles of liquid from the gas.

9. Contact apparatus for liquid and gas comprising an enclosed chamber, a gas inlet for supplying gas to said chamber, a gas outlet for withdrawing gas from said chamber, means for passing the gas over the surface of a body of the liquid in the container for effecting intimate contact therebetween by causing it to atomize a portion of the liquid and circulate it upwardly within said chamber, means for collecting a portion of said liquid and returning it to the body of liquid for further circulation within the chamber, a body of interstitial material within said container between said inlet and outlet through which the gas passes in one direction, means for passing a liquid through said material in the opposite direction for effecting further intimate contact between the liquid and the gas, and means for collecting and supplying liquid passing through said material to the aforesaid body of liquid.

10. Contact apparatus for liquid and gas comprising an enclosed chamber, a transverse plate separating said chamber into an upper and lower compartment, a conduit connecting the upper and lower compartments and extending downwardly in said lower compartment to a point adjacent the surface of the liquid in the container, means for passing gas into said lower compartment above the liquid level and upwardly through said conduit, the cross-sectional area of said conduit being sufficiently small relative to the cross-sectional area of the chamber and the gas pressures to cause the gas to flow past the lower edge of the conduit and upwardly therethrough at velocities sufficient to raise a heap of liquid within an area defined by said conduit and atomize a portion thereof, a perforated plate spaced above said transverse plate dividing the upper compartment into lower and upper sections, a body of interstitial material within said upper section through which the gas passes in an upward direction after passing through the lower compartment and lower section, means for passing a liquid in the opposite direction through said material, and an outlet for withdrawing gas from said chamber.

11. Contact apparatus for liquid and gas comprising an enclosed chamber, a transverse plate separating said chamber into an upper and a lower compartment, a conduit connecting the upper and lower compartments and extending downwardly to a point adjacent the surface of the liquid in the container, means for passing gas into said lower compartment above the liquid level and upwardly through the conduit in such manner as to cause the gas as it enters said conduit to form a cone of liquid on the surface and atomize a portion thereof and carry it upwardly through the conduit, a second transverse plate spaced above the first plate dividing the upper compartment into upper and lower sections, said plate being provided with openings to permit the flow of liquid or gas therethrough, a body of interstitial material within said upper section through which the gas passes in an upward direction, means for passing a liquid in the opposite direction through said material, an outlet for withdrawing gas from said chamber, and means for removing entrained particles of liquid from the gas between the outlet and said body of material.

12. Contact apparatus for liquid and gas comprising an enclosed chamber, a transverse plate separating said chamber into an upper and a lower compartment, a conduit connecting the upper and lower compartments and extending downwardly to a point adjacent the surface of the liquid in the container, means for passing gas into said lower compartment above the liquid level and upwardly through the conduit in such manner as to cause the gas as it enters said conduit to form a cone of liquid on the surface and atomize a portion thereof and carry it upwardly through the conduit, a second transverse plate spaced above the first plate dividing the upper compartment into upper and lower sections, said plate being provided with openings to permit the flow of liquid or gas therethrough, a body of interstitial material within said upper section through which the gas passes in an upward direction, means for passing a liquid in the opposite direction through said material, an outlet for withdrawing gas from said chamber, means for removing entrained particles of liquid from the gas between the outlet and said body of material, and means for collecting and supplying liquid passing through said body of material to the lower compartment of said container.

WILLARD P. CHANDLER, Jr.